Figure 1:
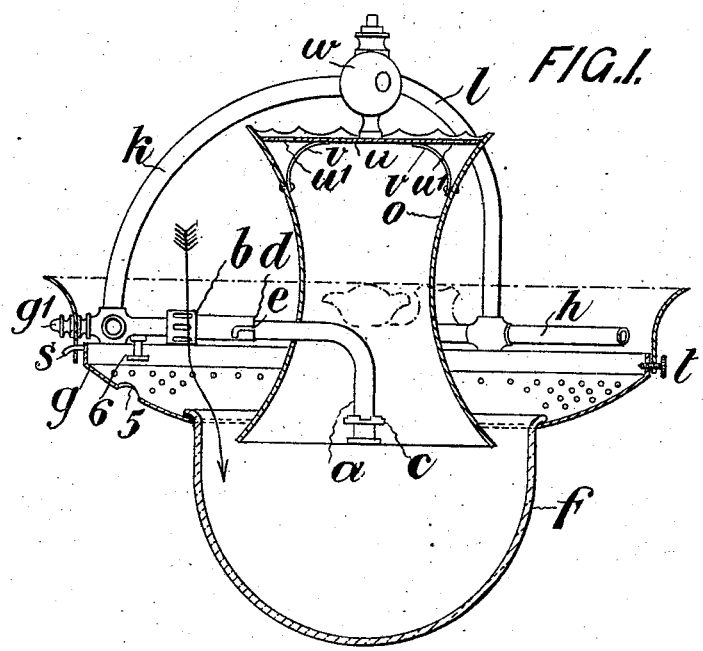

No. 857,233. PATENTED JUNE 18, 1907.
A. S. FRANCIS.
INVERTED INCANDESCENT GAS BURNER.
APPLICATION FILED APR. 20, 1906.

5 SHEETS—SHEET 1.

Witnesses..
H. L. Ames.
R. V. Sommers.

Inventor
Adolphus Sydney Francis.
by Henry Orth
atty.

No. 857,233. PATENTED JUNE 18, 1907.
A. S. FRANCIS.
INVERTED INCANDESCENT GAS BURNER.
APPLICATION FILED APR. 20, 1906.

5 SHEETS—SHEET 2.

Witnesses.
H. L. Amer.
O. N. Sommers

Inventor.
Adolphus Sydney Francis.
by Henry Orth atty.

No. 857,233. PATENTED JUNE 18, 1907.
A. S. FRANCIS.
INVERTED INCANDESCENT GAS BURNER.
APPLICATION FILED APR. 20, 1906.

5 SHEETS—SHEET 3.

Witnesses.
H. L. Ames.
C. B. Sommers.

Inventor.
Adolphus Sydney Francis
by Henry Orth, atty.

No. 857,233. PATENTED JUNE 18, 1907.
A. S. FRANCIS.
INVERTED INCANDESCENT GAS BURNER.
APPLICATION FILED APR. 20, 1906.

5 SHEETS—SHEET 4.

Witnesses.
H. L. Amer.
R. W. Sommers

Inventor:
Adolphus Sydney Francis,
by Henry Orth, atty.

No. 857,233. PATENTED JUNE 18, 1907.
A. S. FRANCIS.
INVERTED INCANDESCENT GAS BURNER.
APPLICATION FILED APR. 20, 1906.
5 SHEETS—SHEET 5.
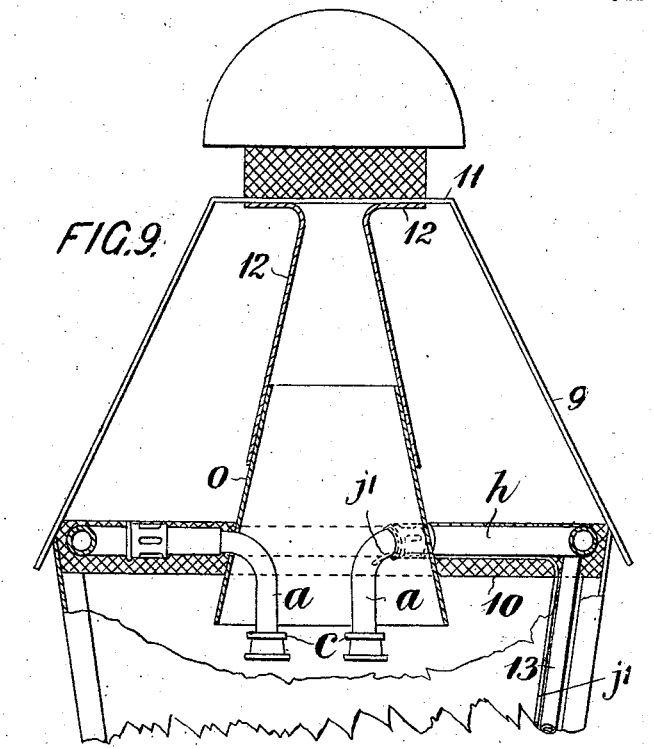
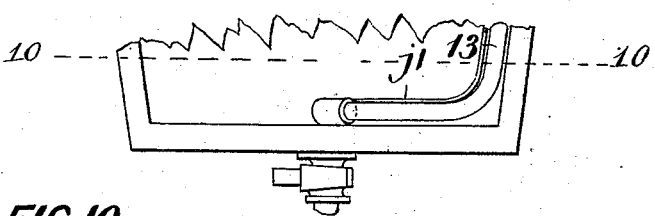
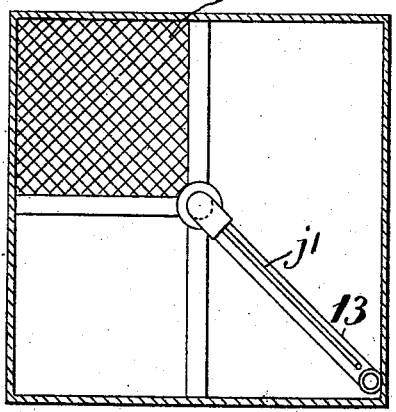
Witnesses.
Inventor.
Adolphus Sydney Francis

UNITED STATES PATENT OFFICE.

ADOLPHUS SYDNEY FRANCIS, OF LONDON, ENGLAND.

INVERTED INCANDESCENT GAS-BURNER.

No. 857,233.

Specification of Letters Patent.

Patented June 18, 1907.

Application filed April 20, 1906. Serial No. 312,866.

*To all whom it may concern:*

Be it known that I, ADOLPHUS SYDNEY FRANCIS, a subject of the King of Great Britain, residing at 155 Farringdon road, London, England, have invented new and useful Improvements in Inverted Incandescent Gas-Burners, of which the following is a specification.

This invention comprises improvements in and relating to inverted incandescent gas burners and refers to those lamps in which a cluster of two or more incandescent burners of the inverted type is or are employed in a globe or lantern, the said invention having for object to increase the efficiency of the burners in such lamps and to render them more accessible for cleaning, adjustment and repair.

In such lamps, as heretofore constructed, great difficulty has been experienced in changing one mantle without injuring the others, and in cleaning the burner without injuring the mantles, moreover the air inlets to the mixing chambers have generally been in a vertical line, or nearly so, with the burner point and mantle, whereby it was impossible for a sufficient amount of pure air to enter the mixing chambers, such air being vitiated by the admixture of products of combustion, in spite of the provision of deflectors and other devices which were employed with the object of obviating this defect. This was more especially the case with outdoor lamps, because it was necessary that these lamps should be substantially windproof and this necessitated the burner being wholly inclosed, the result therefore was a very poor flame and an inefficient light, for the burner was what may be termed, partially "suffocated" by the products of combustion being drawn into the mixing chamber of the burner. For indoor lamps or lamps in sheltered positions, it has been sought to overcome this suffocation by providing holes in the inclosing globe, but such holes permit any draft that there may be, to blow direct onto the mantles which are thereby damaged or destroyed, and even then pure air is only supplied at the point of combustion, the products of combustion still entering the mixing chamber of the burner and impoverishing the flame. The imperfect combustion, which takes place owing to insufficient fresh air supply to the Bunsen tube results in a flame of low temperature and consequently "sooting" of the burner and mantle.

Figure 2:
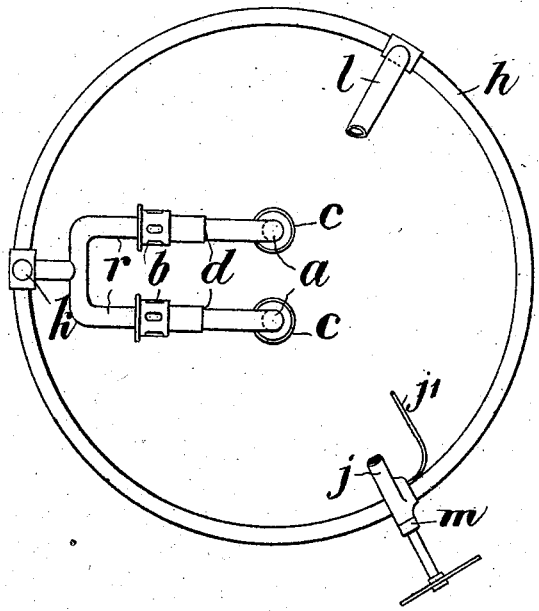
Figure 3:
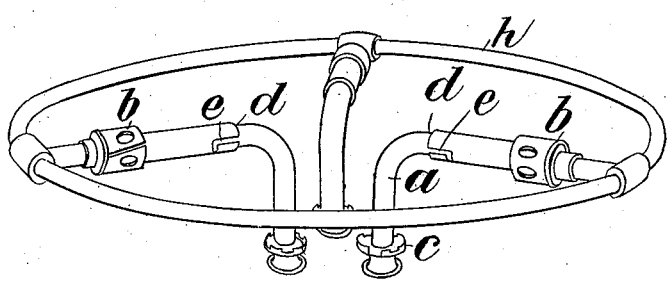
Figure 4:
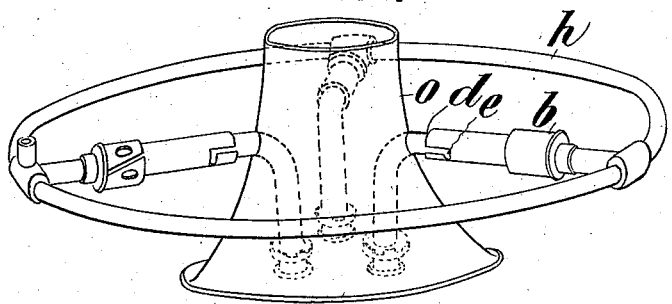
Figure 5:
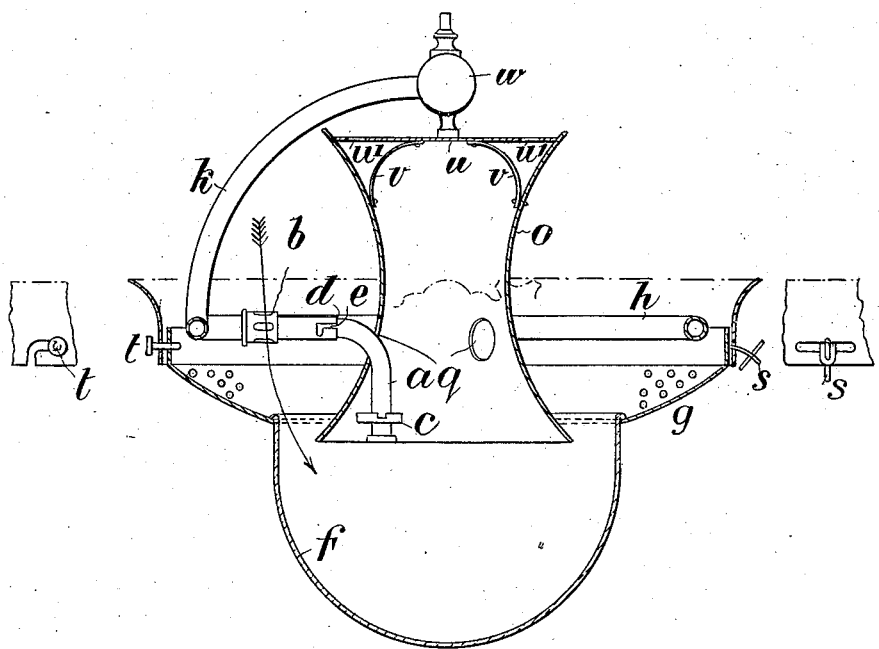
Figure 6:
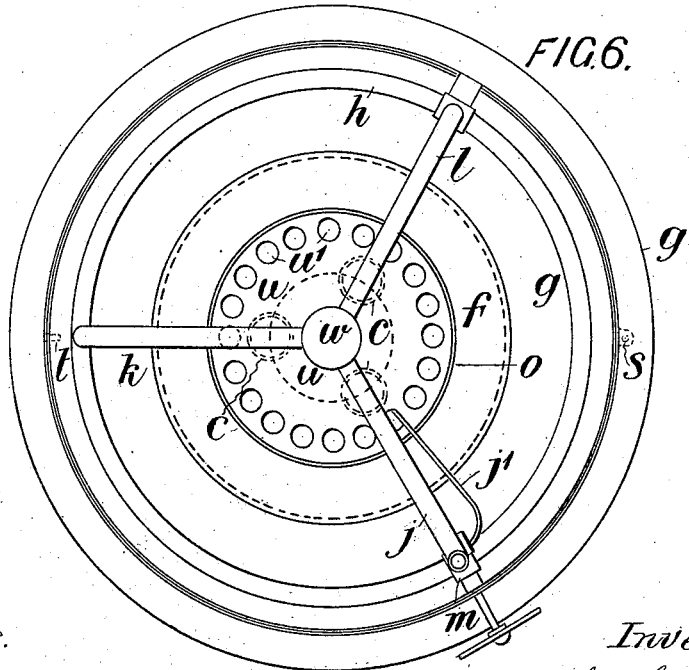
Figure 7:
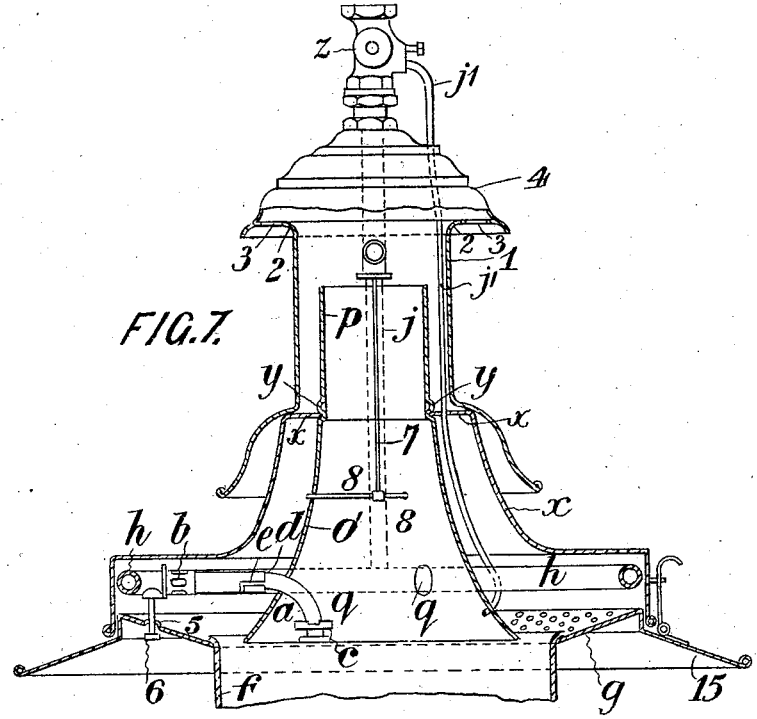
Figure 8:
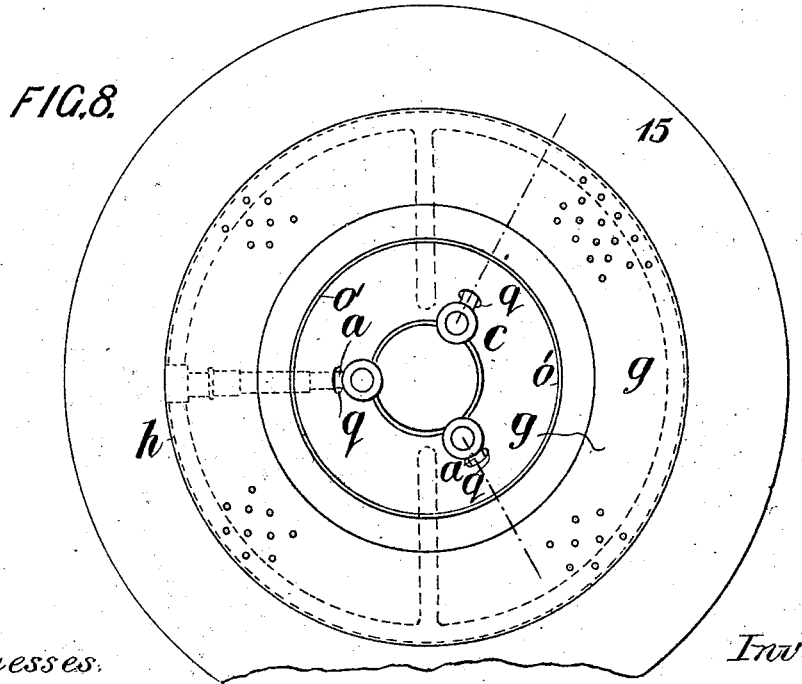

In the accompanying drawings:—Figure 1 is a sectional elevation of a lamp constructed and arranged according to this invention. Fig. 2 is a plan of the burners and ring pipe therefor. Fig. 3 is a perspective view of a cluster of inverted burners with a ring pipe for supplying gas thereto. Fig. 4 is a similar view to Fig. 3 but showing a chimney fitted over the cluster. Fig. 5 is a sectional elevation of an improved indoor lamp and Fig. 6 is a plan view thereof. Fig. 7 is a sectional elevation of an improved outdoor lamp. Fig. 8 is a plan view of the lamp inverted. Fig. 9 is a sectional elevation of an improved street lamp and Fig. 10 is a section on the line 10—10, Fig. 9.

Throughout the figures similar letters indicate similar parts.

The burners $a$ employed with this invention are the well known Bunsen tubes bent to a right angle or thereabout with the mixing chambers $b$ situated near to the fixed ends of the horizontal arms and the mantle supporting rings $c$ near to the lower or free ends of the vertical arms. According to this invention the burners are divided, say at a convenient point $d$ along the horizontal arms, into two portions which slide telescopically one upon the other and may be bayonet jointed as at $e$. This construction enables an easy removal of the vertical portion of any burner with or without the mantle for the purpose of renewing the mantle or of cleaning the burner without interfering with or injuring the other mantle or mantles. The globe $f$, Fig. 1, is preferably a closed one as shown and the mixing chamber $b$ of each burner being situated near to the top of the globe $f$ or its corona $g$ and close to the edge of the same, is in the line of the in-draft, indicated by the arrow, Fig. 1, and is out of the line of the upward current of heated products of combustion from the mantles, consequently it is in the very best position for receiving pure air not contaminated by the products of combustion.

For lamps having clusters of burners as shown in the various figures of the drawings a ring pipe $h$ is supported more or less horizontally in the lamp and is supplied with gas by a pipe brought into the lamp in any convenient direction. In Figs. 1 and 2 the ring pipe $h$ is suspended by pipes $j$, $k$, $l$ one of which, viz: $j$, is the gas supply pipe fitted with a valve $m$ for turning the gas on or off; a by pass pipe $j'$ may also be fitted. In Fig. 3 the incandescent burners $a$ of the type above described project radially inward from the ring pipe $h$ and the mantles suspended from the rings $c$ may thus be brought quite close together in the center, the burners being if necessary adjustable to permit of varying the proximity of the mantles to one another. Thus one of the burner tips can be easily unfastened at its joint $e$ and be removed for cleaning or for applying a new mantle without disturbing the other mantles.

In some cases it is advantageous to fit a chimney $o$, Figs. 1, 4, 5, 7 and 9 over the burner or cluster of burners $a$ and such chimney $o$ is preferably in the form of a frustum of a cone. The frustum might in some cases be surmounted by a straight cylindrical portion, as for instance the portion $p$, Fig. 7, or by another frustum of a cone so that the chimney would be flared at both ends as seen in Figs. 1 and 5 the walls of the chimney being shown curved to give an artistic appearance. Apertures $q$ are formed in the chimneys $o$ for the burners $a$ to project through and in such positions that the lower ends of the chimneys come just below the corona $g$ and just above the points of the burners or about level with the top of the mantle. The upper ends of the chimneys may be scalloped or otherwise ornamented, as shown in dotted lines at the top of Fig. 5. The chimneys serve to carry off the products of combustion and keep them from the mixing chambers, they also improve the light by warming the current of air descending to the mantles.

In Figs. 1 and 2 two burners $a$ are arranged parallel to one another and are connected by a Y junction pipe $r$ with the ring pipe $h$. The corona $g$, Fig. 1, is conveniently made in two parts hinged together at $s$ on one side and locked as at $t$ on the other side. The upper part of the corona may be attached to the ring pipe $h$ by ornamental studs $g'$, Fig. 1. By loosening the fastening $t$, say a screw stud in a bayonet slot, the lower portion of the corona can be let down about the hinge $s$ comprising say a lug on one part projecting through a slot in the other, as shown in Fig. 5, the lug being prevented from coming out of the slot by a pin. The upper portion of the corona $g$ may have an ornamental or artistic appearance as shown in chain lines and the lower portion may be provided with perforations, as indicated for the supply of air. The chimney $o$, Figs. 1 and 5, may be fitted with a cover $u$ having a ring of perforations $u'$ and supported say on spring arms $v$; the cover serves to disperse the rising gases of combustion and deflect them from the ball joint $w$, when used, thereby keeping such joint cool and preventing discoloration of the ceiling.

The construction of lamp seen in Figs. 5 and 6 differs from that seen in Figs. 1 and 2, inasmuch as three radial burners $a$ are employed in place of the two parallel ones. These lamps are suitable for indoor use being not so completely inclosed and shielded as an outdoor lamp which will now be described.

The lamp for outdoor work, such as for lighting public places, shop exteriors and windows, as seen in Figs. 7 and 8, comprises a corona or a suitably curved annular perforated plate $g$ supporting a globe $f$. The corona may again be in two portions hinged together, the upper portion being fastened or not to the ring pipe $h$. Suitably secured to the upper portion is a cover $x$ for the lamp, which cover is made more or less deep by being extended upward in the form of a cylinder, or the cover $x$ might be domed. The cover is provided with a central aperture to permit of the insertion of the cylindrical portion $p$ of a chimney $o'$ and lugs or bulges $y$ may be formed on the part $p$ of the chimney and adapted to pass through slots (not shown) at the edge of the central aperture in the cover $x$ after which by giving the chimney $o'$ $p$ a partial turn the lugs $y$ engage the cover $x$ and the chimney is supported therefrom. The ring pipe $h$, to which any desired number of burners $a$ are connected, may or may not support the cover $x$ from the underside and is again conveniently arranged just above the perforated portion of the corona $g$. Apertures are formed in the cover for any desired number of pipes such as $j$ $k$ $l$ Fig. 6 to pass through, which pipes are connected to the ring $h$ at their lower ends and supply gas to the burners $a$, and at their upper ends are connected to a junction $z$ to which is connected a pipe for suspending the lamp. A wide chimney 1 with a curved flange 2 at its upper end is superimposed upon the cover, outlet holes 3 for the products of combustion being formed around the flange. The upper end of the chimney 1 or top of the lamp is suitably closed in by a plate, or any other suitable wind proof head such as 4, having a central aperture for the suspension and gas supply pipe to pass through. In the corona $g$ and beneath each burner $a$ a somewhat large hole 5 may be formed and through these holes gas cock handles 6 may project by means of which any burner may be regulated or turned off separately should the mantle thereupon be damaged, say in a gale of wind, when it would be disastrous to the other mantles to open the lamp. The lower or inner chimney $o$ may be further supported by means of a rod 7 suspended from the pipe junction $z$ and having radiating arms 8 engaging or passing through the chimney. The upward draft caused by the heat and products of combustion from the cluster of mantles induces an in-draft of air through the perforations in the corona, part of which air is drawn into the mixing chamber $b$ of the burners $a$ and part passes down the inside of the glass globe and cools the same and itself becomes heated and then passes upward to the burners, the warming of the air tending to increase the temperature of the flame. If desired additional air inlet holes may be provided in the cover or outer casing x. In this construction there is ample air supply for the burners and a much better mixture of gas and air is obtained whereby "sooting" of the burner tips is avoided and a more efficient light results. The close proximity of the mantles to one another in the cluster enables a much smaller globe to be used than hitherto and the mutual heating of the mantles increases their efficiency. The corona g may be formed as or fitted with a shade or reflector 15.

For an ordinary street lamp, as for instance that shown in Figs. 9 and 10, to be supported, say, on a column, the ring pipe h may be arranged in the roof 9 of the lamp and just above the glass panes, rows of perforations or gauze 10 being provided in the neighborhood of the ring pipe h. The arrangement of burners a and chimney o is similar to those hereinbefore described and the chimney o may be suspended from the top 11 of the lamp by lugs or arms 12, or from the ring pipe h by arms in addition to the radiating burners. The ring pipe h is supplied with gas by a pipe 13 taken up inside the lamp and if desired there may be gauze 14 in the bottom of the lamp for admitting more air.

What I claim and desire to secure by Letters Patent is:—

1. An inverted incandescent gas burner comprising a gas supply pipe, a ring pipe connected thereto, a plurality of bent-burner tubes connected to said ring and projecting substantially radially inward the free ends of said bent tubes projecting substantially vertically downward, air inlets to said tubes in proximity to said ring pipe, and mantle supporting means on said tubes near the free ends of same, said free ends being in proximity to one another substantially as and for the purpose set forth.

2. An inverted incandescent gas burner comprising a gas supply pipe, a ring pipe connected thereto, a plurality of bent burner tubes connected to said ring and projecting substantially radially inward the free ends of said bent-tubes projecting substantially vertically downward, air inlets to said tubes in proximity to said ring pipe, mantle supporting means on said tubes near the free ends of same, said free ends being in proximity to one another, a chimney flared at its lower end, and apertures in said chimney through which said tubes project substantially as and for the purpose set forth.

3. An inverted incandescent gas burner comprising a gas supply pipe, a ring pipe connected thereto, a plurality of two-part bent burner tubes connected to said ring and projecting substantially radially inward, the free ends of said bent tubes projecting substantially vertically downward, air inlets to said tubes in proximity to said ring pipe, a sliding joint between the parts of each of said tubes, mantle supporting means on said tubes near the free ends of same, said free ends being in proximity to one another substantially as and for the purpose set forth.

4. An inverted incandescent gas burner comprising a gas supply pipe, a ring pipe connected thereto, a plurality of two-part bent burner tubes connected to said ring and projecting substantially radially inward, the free ends of said bent tubes projecting substantially vertically downward, air inlets to said tubes in proximity to said ring pipe, a sliding joint between the parts of each of said tubes, mantle supporting means on said tubes near the free ends of same said free ends being in proximity to one another, a chimney flared at its lower end, and apertures in said chimney through which said tubes project substantially as and for the purpose set forth.

5. An inverted incandescent gas burner comprising a gas supply pipe, a ring pipe connected thereto, a plurality of bent burner tubes connected to said ring and projecting substantially radially inward, the free ends of said bent tubes projecting substantially vertically downward, air inlets to said tubes in proximity to said ring pipe, mantle supporting means on said tubes near the free ends of same, said free ends being in proximity to one another, a chimney flared at its lower end, apertures in said chimney through which said tubes project, an imperforate globe of larger diameter than the flared end of said chimney and means supporting said globe beneath said burners and beneath said chimney substantially as and for the purpose set forth.

6. An inverted incandescent gas burner comprising a gas supply pipe, a ring pipe connected thereto, a plurality of bent burner tubes connected to said ring and projecting substantially radially inward, the free ends of said bent tubes projecting substantially vertically downward, air inlets to said tubes in proximity to said ring pipe, mantle supporting means on said tubes near the free ends of same, said free ends being in proximity to one another, a chimney flared at its lower end, apertures in said chimney through which said tubes project, said apertures being so disposed that said free ends are approximately in the same plane as the flared end of said chimney, an imperforate globe of larger diameter than said flared end, and means supporting said globe beneath said burners and beneath said chimney and with its upper edge about in said plane, substantially as and for the purpose set forth.

7. An inverted incandescent gas burner comprising a gas supply pipe, a ring pipe connected thereto, a plurality of bent burner tubes connected to said ring and projecting substantially radially inward, the free ends of said bent tubes projecting substantially vertically downward, air inlets to said tubes in proximity to said ring pipe, mantle supporting means on said tubes near the free ends of same, said free ends being in proximity to one another, a chimney flared at its lower end, apertures in said chimney through which said tubes project, an imperforate globe of larger diameter than the flared end of said chimney, means supporting said globe beneath said burners and beneath said chimney, a cover closing the upper end of said chimney, and a ring of apertures situated near to the edge of said cover, substantially as and for the purpose set forth.

8. An inverted incandescent gas burner comprising a gas supply pipe, a ring pipe connected thereto, a plurality of bent burner tubes connected to said ring and projecting substantially radially inward, the free ends of said bent tubes projecting substantially vertically downward, air inlets to said tubes in proximity to said ring pipe, mantle supporting means on said tubes near the free ends of same, said free ends being in proximity to one another, a chimney flared at its lower end, apertures in said chimney through which said tubes project, an imperforate globe of larger diameter than the flared end of said chimney, means supporting said globe beneath said burners and beneath said chimney, and a domed cover supported upon said chimney for the purpose of further isolating the fresh air supply from the escaping gases of combustion, substantially as and for the purpose set forth.

In testimony whereof I have signed my name to this specification in the presence of two subscribing witnesses.

ADOLPHUS SYDNEY FRANCIS.

Witnesses:
V. JENSEN,
H. D. JAMESON.